United States Patent
Beckman et al.

(10) Patent No.: US 6,385,448 B1
(45) Date of Patent: May 7, 2002

(54) PREDICTIVE REGISTRATION IDENTIFICATION TIMER

(75) Inventors: James E. Beckman, Boulder, CO (US); David J. Hoover, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/636,206

(22) Filed: Aug. 10, 2000

(Under 37 CFR 1.47)

Related U.S. Application Data (63) Continuation of application No. 09/039,651, filed on Mar. 16, 1998, now abandoned.

(51) Int. Cl.[7] ................................................. H04Q 7/20
(52) U.S. Cl. ..................... 455/435; 455/422; 455/432
(58) Field of Search ................................. 455/435, 436, 455/432, 515, 434, 410; 370/329, 338

(56) References Cited

U.S. PATENT DOCUMENTS

| | | | |
|---|---|---|---|
| 5,097,499 A | * 3/1992 | Cosentino ................. | 455/435 |
| 5,509,052 A | * 4/1996 | Chia et al. ................ | 455/465 |
| 5,649,286 A | * 7/1997 | Frerking .................. | 455/435 |
| 5,734,977 A | * 3/1998 | Sanmugam ................ | 455/410 |
| 5,768,267 A | * 6/1998 | Raith et al. ............... | 370/329 |
| 5,774,805 A | * 6/1998 | Zicker ..................... | 455/426 |
| 5,778,316 A | * 7/1998 | Persson et al. ............ | 455/434 |
| 5,911,120 A | * 6/1999 | Jarett et al. .............. | 455/417 |
| 5,920,816 A | * 7/1999 | Khan et al. ............... | 455/435 |
| 6,064,889 A | * 5/2000 | Fehnel ..................... | 455/511 |

* cited by examiner

Primary Examiner—Nay Maung
Assistant Examiner—Sonny Trinh
(74) Attorney, Agent, or Firm—Coats & Bennett, P.L.L.C.

(57) ABSTRACT

The present invention provides a new method for determining the point at which the mobile station is required to transmit a periodic registration to the base station when the mobile station is locked onto a DAMPS Digital Control Channel. The REGID system clock in the mobile station is replaced with a timing mechanism termed REGID_PER_TMR. Instead of tracking the REGID system clock from zero to NXTREG, REGID_PER_TMR is a function of the NXTREG permanent variable and the REGID_PER variable transmitted in the Registration Parameters FBCCH message. Thus, REGID_PER_TMR is calculated as a specific time period as a function of NXTREG and REGID_PER on power up of the mobile station and does not need to be stored within the memory of the mobile station. REGID_PER_TMR then functions as a countdown timer relative to NXTREG such that the mobile station automatically executes Periodic Registration Determination per IS 136.1, Section 6.3.9 on expiration of REGID_PER_TMR. Since the REGID system clock has been eliminated, the value of REGID is calculated on an as-needed basis from other parameters.

13 Claims, 6 Drawing Sheets

PREDICTIVE REGISTRATION IDENTIFICATION TIMER

This application is a continuation of application Ser. No. 09/039,651, filed Mar. 16, 1998, now abandoned.

FIELD OF THE INVENTION

The present invention relates generally to the field of digital radio communication systems and, more particularly, to the periodic registration procedure in a digital radio communication system used to identify and update the location and activity status of mobile radio communication devices within said system.

BACKGROUND OF THE INVENTION

When a mobile station is powered up, its operational parameters within the network system must be determined. In general, the mobile station first goes through the process of selecting a candidate service provider. When a suitable candidate is determined, the mobile station then searches for service on a particular digital control channel (DCCH). Having found service on a DCCH, the mobile station then reads the service parameters from the fast broadcast control channel (FBCCH) before entering the digital control channel camping state. As part of continued service on a particular digital control channel (DCCH), the mobile station must periodically execute a registration which is transmitted to the base station. This periodic registration provides an update of location and activity status of the mobile station to the base station. This registration procedure applies to mobile stations on a DAMPS Digital Control Channel (DCCH) per Telecommunications Industry Association Standard IS 136.1, the entirety of which is hereby incorporated by reference.

In layer 3 communications, the Registration Parameters FBCCH message is mandatory and the data associated with this message is always transmitted to the mobile station by the base station on power up. The FBCCH includes many information elements. The information elements particularly affecting the registration function include the "REG Period" and the "REGID Parameters." The REG Period information element (REG Period IE) gives the registration period of the mobile station, expressed in increments of 94 superframes, and may vary from 94 to 48,128 superframes. That is, the mobile station is required to transmit a periodic registration to the base station after a certain multiple of 94 superframes have elapsed. Since a superframe is equivalent to approximately 640 milliseconds, 94 superframes represents approximately one minute. The REGID Parameters information element (REGID Parameters IE) includes the sub-elements REGID and REGID_PER. REGID is an updateable system clock internal to the mobile station ranging from 0 to 1,048,575 increments. An increment represents a fixed period of time determined as a function of REGID_PER. REGID_PER indicates how often REGID is incremented and is expressed in superframes. The REGID Parameters IE may be updated by the base station at any time and then transmitted to the mobile station via the FBCCH.

Layer 3 in the mobile station also includes the variable NXTREG which is the value that REGID must equal or exceed before the mobile station transmits a periodic registration to the base station. NXTREG is a permanent variable which remains stored in the mobile station even when the power is turned off. Following the current protocol outlined in IS 136.1, both NXTREG and REGID are required to be stored in the memory of the mobile station on power down of the unit.

When the mobile station is turned on or powered up, it will read the Registration Parameters from the FBCCH and then enter the DCCH camping state. The camping state refers to a state of readiness attained by the mobile station after initialization via the FBCCH, where it will remain as long as the mobile station is locked onto the best DCCH. The mobile station will leave this state only to process certain transactions such as power up, power down, an originated call, a terminated call, or a registration. A full description of the DCCH camping state is provided in IS 136.1, Section 6.2.3.

The REGID system clock is incremented by counting the number of superframes on the control channel. After each superframe is completed, the mobile station 16 determines whether the threshold amount of superframes, corresponding to the variable REGID_PER, has been reached. If the specified number of superframes is reached, the REGID system clock is incremented. Each time the REGID system clock is incremented, the Registration Procedure per IS 136.1, Section 6.3.7 is called. Within the Registration Procedure is the Periodic Registration Determination detailed in IS 136.1, Section 6.3.9. Periodic Registration Determination basically compares REGID (Current Registration ID) with NXTREG. If REGID is less than NXTREG, the mobile station returns to the camping state and awaits the next incrementation of REGID after the next fixed amount of superframes, as defined by REGID_PER, have elapsed. On the other hand, if REGID is greater than or equal to NXTREG, the mobile station is instructed to transmit a periodic registration to the base station. The REGID system clock is then reset and the procedure of tracking elapsed superframes begins anew.

In review, the previous method for determining registration timing of the mobile station outlined by IS 136.1 requires that the amount of elapsed superframes be compared to REGID_PER after each superframe. Also, the REGID system clock must be incremented and compared to NXTREG after every REGID_PER superframe increment. Thus, computational power requirements for the mobile station under this protocol are significantly high since calculations must be performed after every superframe and the REGID system clock constantly has to be checked and stored in memory.

SUMMARY AND OBJECTS OF THE INVENTION

The present invention provides a new method for determining the point at which the mobile station is required to transmit a periodic registration to the base station when the mobile station is locked onto a DAMPS Digital Control Channel. The REGID system clock in the mobile station is replaced with a timing mechanism termed REGID_PER_TMR. Instead of tracking the REGID system clock from zero to NXTREG, REGID_PER_TMR is a function of the NXTREG permanent variable and the REGID_PER variable transmitted in the Registration Parameters FBCCH message. Thus, REGID_PER_TMR is a specific time period calculated as a function of NXTREG and REGID_PER on power up of the mobile station and does not need to be stored within the memory of the mobile station. REGID_PER_TMR then functions as a countdown timer relative to NXTREG such that the mobile station automatically transmits a periodic registration upon expiration of REGID_PER_TMR. Since the REGID system clock has been eliminated, the value of REGID is calculated on an as-needed basis from other parameters.

It follows that, by eliminating the REGID system clock, the mobile station no longer needs to perform computations after every superframe to determine if the REGID system clock must be incremented. In addition, the mobile station does not need to determine if REGID is greater than NXTREG each time the REGID system clock is incremented. Thus, one object of the present invention is to lower the power consumption of the mobile station where Periodic Registration Determination is only performed after the expiration of REGID_PER_TMR instead of after every superframe.

DETAILED DESCRIPTION OF THE INVENTION

Figure 1:
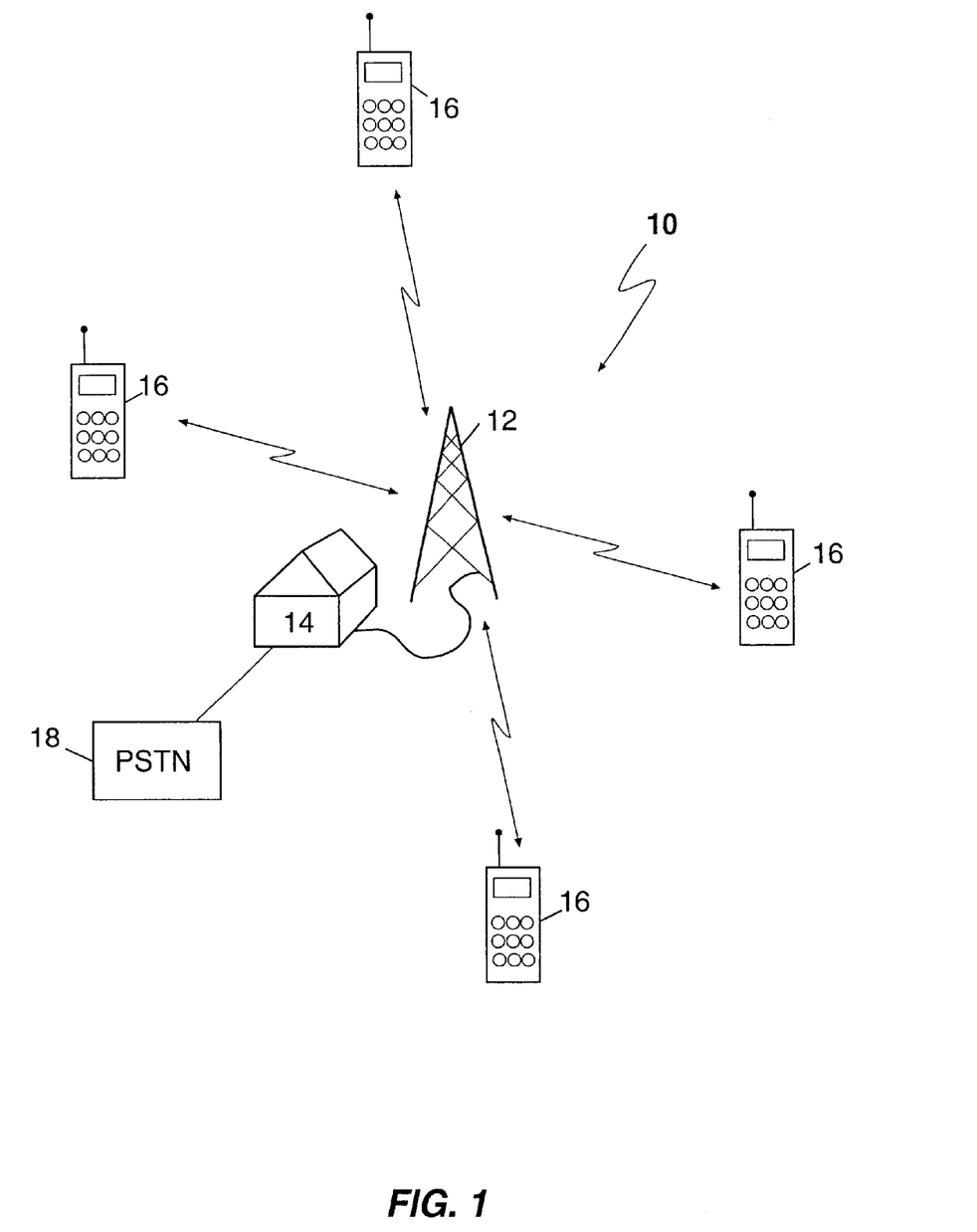
FIG. 1 is a block diagram of a typical mobile communication system.

Referring now to the drawings, a method will be described for determining the proper time for the transmission of a periodic registration by a mobile radio communication device in a digital radio communication system. A digital radio communication system which utilizes the registration method of the present invention is shown in FIG. 1 and is indicated generally by the numeral 10. The mobile cellular system 10 comprises a plurality of base stations 12 which are connected via a mobile services switching center (MSC) 14 to a terrestrial communications network such as the Public Switched Telephone Network (PSTN) 18. Each base station 12 is located in and provides service to a geographic region referred to as a cell. In general, there is one base station 12 for each cell within a given system. Within each cell, there may be a plurality of mobile stations 16 that communicate via radio link with the base station 12. The base station 12 allows the user of the mobile station 16 to communicate with other mobile stations 16, or with users connected to the PSTN 18. The mobile services switching center 14 routes calls to and from the mobile station 16 through the appropriate base station 12. Information concerning the location and activity status of the mobile station 16 is stored in a Home Location Register (HLR) and a Visitor Location Register (VLR) which is connected to the MSC 14.

Figure 2:
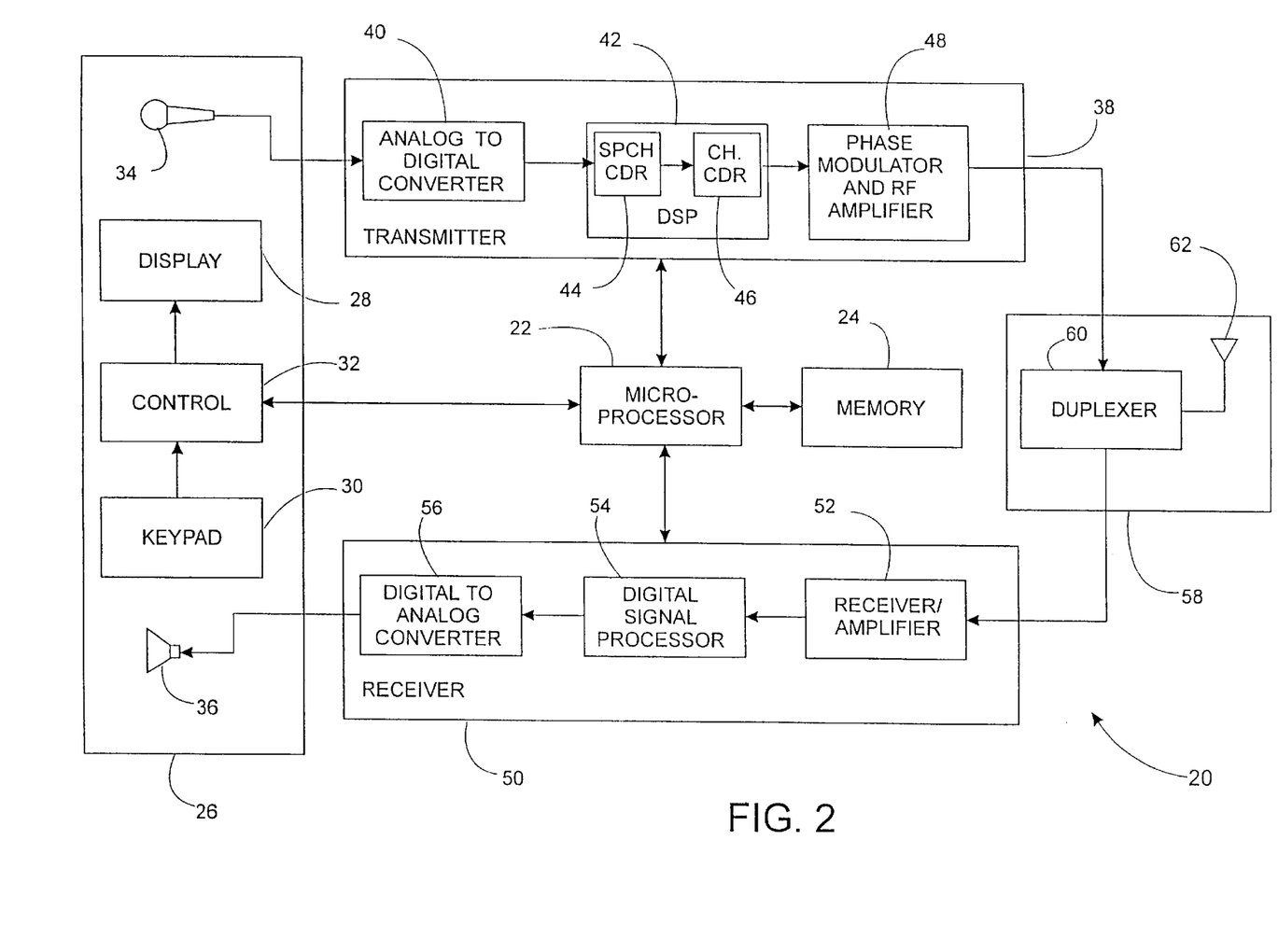
FIG. 2 is a block diagram of a mobile station that uses the registration procedure of the present invention.

FIG. 2 is a block diagram of a typical mobile station 16 that uses the registration method of the present invention. The mobile station 16 shown in FIG. 2 is a fully functional radio transceiver 20 capable of transmitting and receiving digital signals. The transceiver 20 includes an microprocessor 22, an operator interface 26, a transmitter 38, a receiver 50, and an antenna assembly 58.

The operator interface 26 includes a display 28, keypad 30, control unit 32, microphone 34, and speaker 36. The display 28 allows the operator to see dialed digits and call status information. The keypad 30 allows the operator to dial numbers, enter commands, and select options. The control unit 32 interfaces the display 28 and keypad 30 with the microprocessor 22. The microphone 34 receives audio signals from the user and converts the audio signals to analog signals. Speaker 36 converts analog signals from the receiver 50 to audio signals which can be heard by the user.

The analog signals from the microphone 34 are applied to the transmitter 38. The transmitter 38 includes an analog to digital converter 40, a digital signal processor 42, and a phase modulator and RF amplifier 48. The analog to digital converter 40 changes the analog signals from the microphone 34 into a digital signal. The digital signal is passed to the digital signal processor (DSP) 42 which contains a speech coder 44 and channel coder 46. The speech coder 44 compresses the digital signal and the channel coder 46 inserts error detection, error correction and signaling information. The compressed and encoded signal from the digital signal processor 42 is passed to the phase modulator and RF amplifier 48 which are shown as a single block in FIG. 2. The modulator converts the signal to a form which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Digital signals received by the antenna assembly 58 are passed to the receiver/amplifier 52 which boosts the low level RF digital signal to a level appropriate for input to the digital signal processor 54. The digital signal processor 54 includes an equalizer to compensate for phase and amplitude distortions in the channel corrupted signal, and a demodulator for extracting the transmitted bit sequence from the received signal. A channel decoder detects and corrects channel errors in the received signal. The channel decoder also separates control and signaling data from speech data. The control and signaling data is passed to the microprocessor 22. Speech data is processed by a speech decoder and passed to the digital to analog converter 56. The digital to analog converter 56 converts the speech data into an analog signal which is applied to the speaker 36 to generate audible signals which can be heard by the user.

The antenna assembly 58 is connected to the RF amplifier of the transmitter 38 and to the receiver/amplifier 52 of the receiver 50. The antenna assembly 58 includes a duplexer 60 and an antenna 62. The duplexer 60 permits full duplex communications over the antenna 62.

The microprocessor 22 functions coordinates the operation of the transmitter 38 and the receiver 50. These functions include power control, channel selection, timing, as well as a host of other functions. The microprocessor 22 inserts signaling messages into the transmitted signals and extracts signaling messages from the received signals. The microprocessor 22 responds to any base station commands contained in the signaling messages, and implements those commands. When the user enters commands via the keypad 30, the commands are transferred to the microprocessor 22 for action.

The mobile station 16 communicates with the base station 12 on a communications channel. A communications channel is typically a pair of frequencies, one that transmits and one that receives, used by a mobile station 16 to communicate within a wireless communication system. Some communication channels are for control functions (i.e., control channels) while others are for voice and data communications (i.e., traffic channels). Control channels are generally used to transmit control and signaling messages to and from the mobile station 16 that are necessary to maintain service on the communication channel. Traffic channels are used primarily to transmit voice and data signals, however, some control messages are also transmitted on the traffic channels.

In the DAMPS system, the mobile station 16 selects a digital control channel (DCCH) during power-up on which to acquire service. When a suitable DCCH is found, the mobile station 16 enters a control channel camping state. The camping state refers to a state of readiness attained after acquiring service on a control channel. The mobile station 16 will leave the camping state only to process certain transactions such as an originated call, a terminated call, or a registration. A full description of the DCCH camping state is provided in IS 136.1, Section 6.2.3.

The mobile stations 16 must periodically transmit registration data to the base station 12 on the current control channel. This way, the base station 12 knows exactly. which mobile stations 16 are active and in which cell each mobile station 16 is located. For each digital control channel (DCCH), the base station 12 establishes the parameters under which the mobile stations 16 locked onto that specific DCCH will be required to transmit periodic registration to the base station 12. These registration parameters are transmitted from the base station 12 to the mobile stations 16 via the fast broadcast control channel (FBCCH). The registration parameters are contained in the Registration Period information element (REG Period IE) and the Registration Parameters information element (REGID Parameters IE).

The REG Period IE includes the variable REGPER which identifies the registration periodicity of the mobile station 16 in multiples of 94 superframes. In other words, REGPER dictates that the mobile station 16 must transmit a periodic registration to the base station after a multiple of 94 superframes have elapsed. Since there are approximately 640 milliseconds to a superframe, 94 superframes cover a time period of approximately 1 minute. REGPER is binary coded from 0 to 511, indicating 94 to 48,128 superframes or approximately 1 minute to 8.5 hours. A binary 0 corresponds to 94 superframes (1 minute), a binary 1 corresponds to 188 superframes (2 minutes), a binary 2 corresponds to 282 superframes (3 minutes), and so on. Thus, REGPER indicates the time between periodic registrations of the mobile station 16, ranging anywhere from every minute to every 8.5 hours.

The REGID Parameters IE includes the variables REGID and REGID_PER. REGID is the Registration ID system clock ranging in value from 0 to 1,048,575. Since, in the present invention the REGID system clock has been removed from the mobile station 16, REGID must be retrieved from the FBCCH message or calculated from other parameters when necessary. The value of REGID at any time is referred to as the Current Reg ID. REGID_PER indicates the number of superframes between increments of REGID and may vary from 0 to 15 superframes. A value of 0 for REGID_PER indicates that the length of an increment has not been established, corresponding in the IS 136.1 system to a situation where a REGID_PER value of 0 meant that the REGID system clock was not incrementing.

Previously, the REGID system clock was stored in the mobile station 16 along with the variable NXTREG. The present invention replaces the REGID system clock with a new registration timer called REG_PER_TMR and calculates the REGID only when necessary. NXTREG is the only variable stored in the mobile station 16 and periodic registration timing is determined relative to this parameter. When the mobile station is powered down, NXTREG is stored in memory as a permanent variable.

Figure 3A:
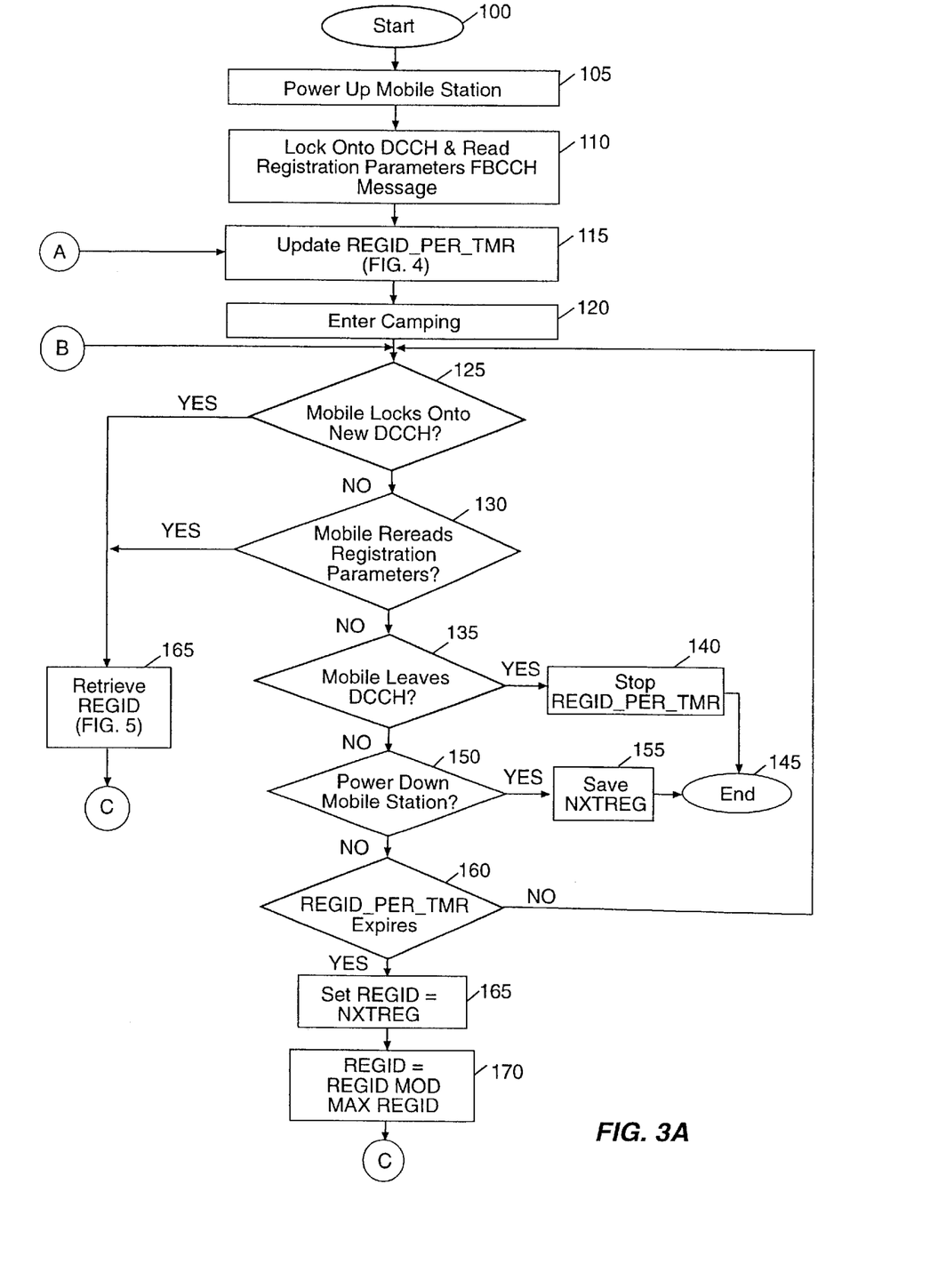
FIGS. 3A and 3B are a flow diagram showing the operation of the mobile station.
Figure 3B:
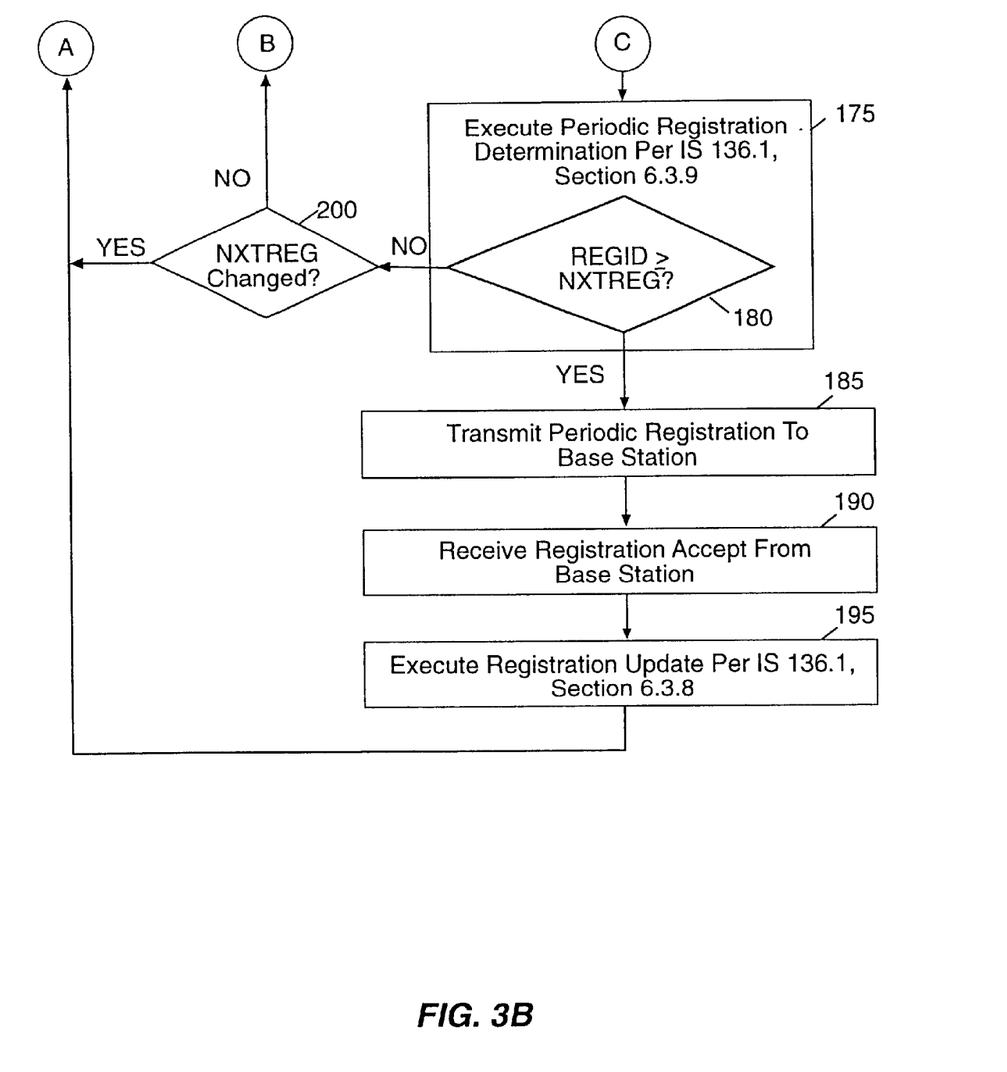
Figure 4:
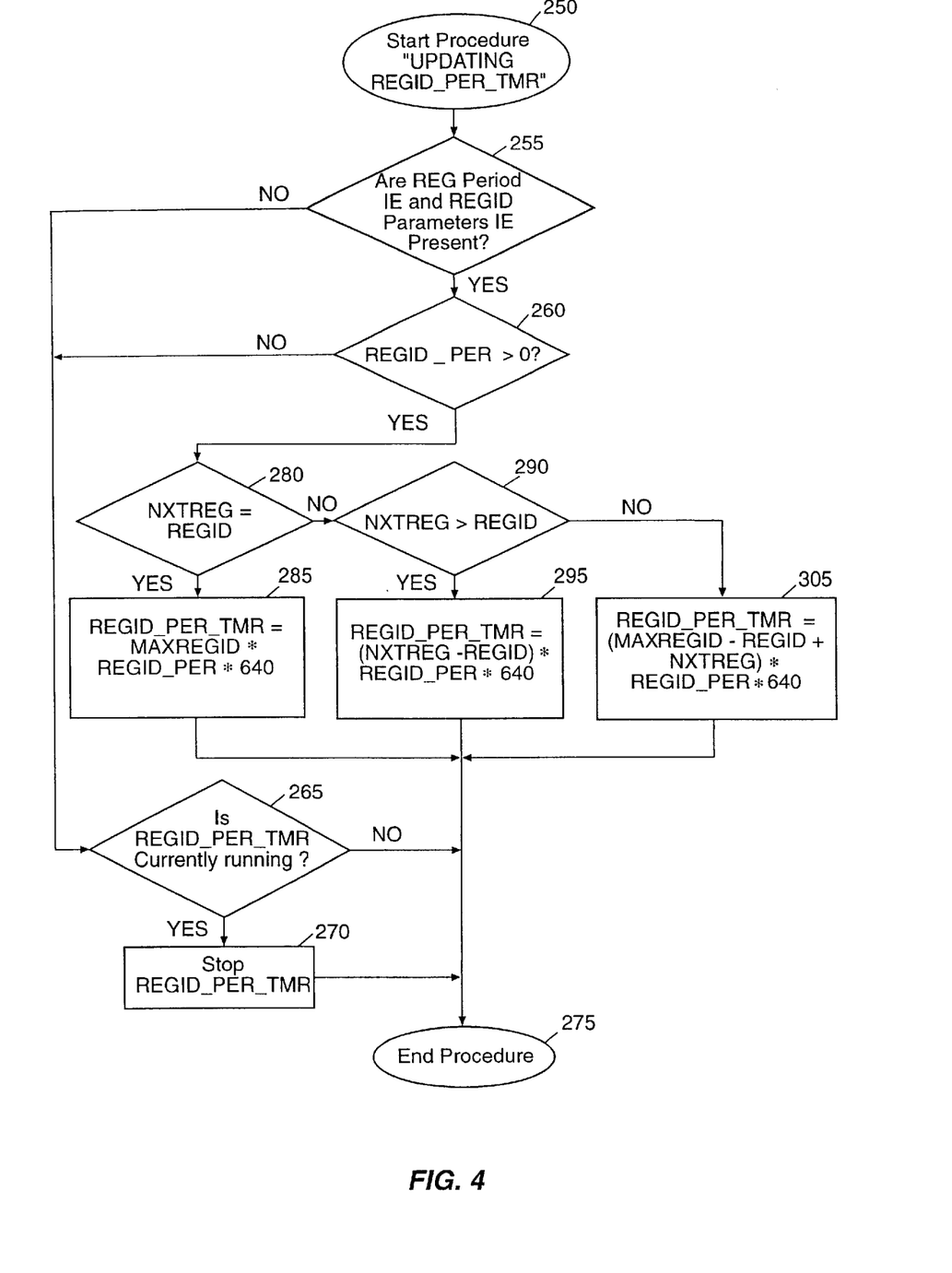
FIG. 4 is a flow diagram of the update procedure used by the mobile station to update the registration timer.
Figure 5:
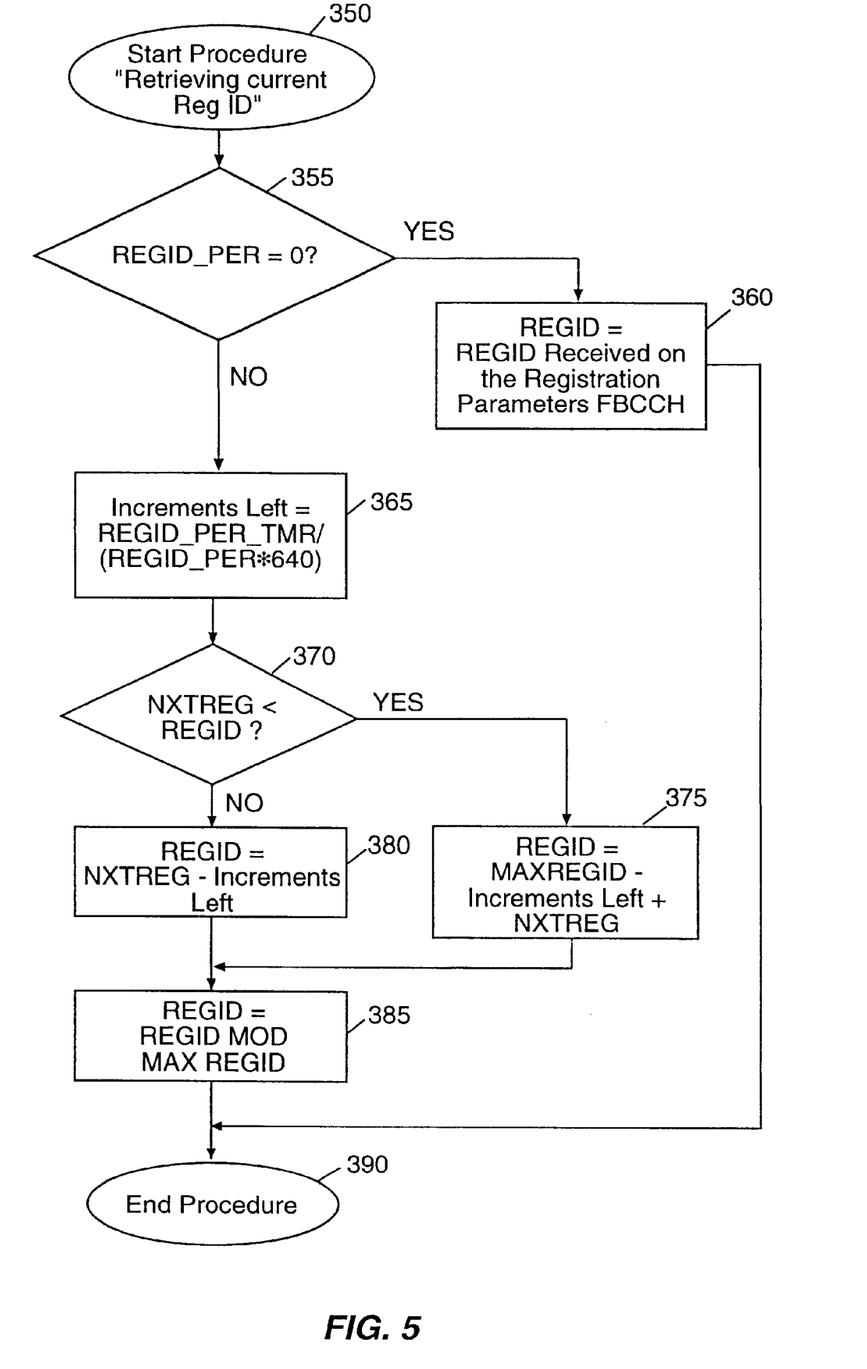
FIG. 5 is a flow diagram of the retrieve procedure used by the mobile station to retrieve the Current Registration ID.

Now referring to FIGS. 3–5, the implementation of the new registration timer is shown. When the system is activated (block 100), the mobile station powers up (block 105), scans through the control channels and locks onto a digital control channel (DCCH) (block 110). The Registration Parameters FBCCH message is then read by the mobile station 16 (block 110), in part providing the mobile station 16 with the REG period and the REGID Parameters information elements. Since the REGID system clock has been deleted in the present invention, the mobile station 16 must use the value of the REGID contained in the FBCCH message and the value of NXTREG stored in memory to calculate the value of the registration time, REGID_PER_TMR. This value is calculated by executing an update procedure (block 115) as shown in FIG. 4 which is described more fully below.

After the mobile station 16 has completed updating REGID_PER_TMR (block 115), the mobile station enters the DCCH camping state (block 120) where REGID_PER_TMR is activated. Notwithstanding any intervening events for which the mobile station 16 will leave the camping state (blocks 125, 130, 135, and 150) which will be explained further herein, the mobile station 16 remains in the camping state until REGID_PER_TMR expires (block 160). On expiration of REGID_PER_TMR (block 160), the mobile station 16 sets REGID equal to NXTREG (block 165). If REGID is greater than MAXREGID, the mobile station 16 resets REGID to a value less than MAXREGID (block 170). This is done by setting REGID equal to the remainder of REGID divided by MAXREGID. After these calculations are completed, the mobile station 16 executes Periodic Registration Determination (block 175) according to IS-136.1, section 6.3.9. This procedure may change the value of NXTREG. After Periodic Registration Determination is performed the mobile station 16 compares REGID to NXTREG. If REGID is greater than NXTREG (which will always be true following expiration of REGID_PER_TMR), the mobile station 16 transmits a periodic registration to the base station 12 which consists of the Registration message with a Periodic indication.

Two events, in addition to expiration of REGID_PER_TMR, may cause a periodic registration to be transmitted. If, before the registration timer expires, the mobile station 16 locks onto a new DCCH (block 125) or rereads the registration parameters (block 130), the mobile station 16 performs a Periodic Registration Determination according to IS-136.1, Section 6.3.9 (block 175). Before performing a Periodic Registration Determination the mobile station 16 retrieves REGID (the Current Registration ID)(block 205). The procedure for retrieving REGID is shown in FIG. 5 and will be described more fully below. After the Periodic Registration Determination is performed, the mobile station 16 compares the value of REGID to NXTREG (block 180). If REGID is greater than NXTREG a periodic registration is transmitted to the base station 12(block 185). If not, the mobile station 16 returns to camping on the DCCH (block 120). Before returning to the camping state, the mobile station 16 determines whether the Periodic Registration Determination resulted in a change in the value of NXTREG (block 180), and if so, invokes the update procedure (block 115) which has been previously described.

When a periodic registration is transmitted by the mobile station 16 (block 185), the base station 12 will send a registration accept message in reply (block 190). After the base station 12 transmits a message to the mobile station 16 that the periodic registration has been accepted (block 190), Registration Update is executed as required by IS 136.1, Section 6.3.8 (block 195). When REGID_PER is greater than zero, NXTREG is set equal to REGID plus the quantity (94*(REG_PER+1)/(REGID_PER*640)). When REGID_PER is zero, NXTREG is set equal to 94*(REG+_PER+1). In general, since NXTREG is altered by this operation, the procedure for updating REGID_PER_TMR as shown in FIG. 4 must subsequently be executed to determine the new value of REGID_PER_TMR (block 115). The mobile station 16 then enters camping until an event occurs or REGID_PER_TMR again expires.

While in the camping state, the mobile station 16 may leave the current DCCH (block 135) or power down (block 140). If the mobile station 16 leaves the current DCCH (block 135), the mobile station 16 stops the registration timer (block 140) and exits the procedure shown in FIGS. 3A and 3B. If the mobile station 16 powers down (block 140), the mobile station 16 saves NXTREG (block 155) before shutting off.

Referring now to FIG. 4 the update procedure for updating REGID_PER_TMR is shown. When the update procedure is invoked (block 250), the mobile station 16 first checks whether the necessary registration parameters are present. Specifically, the mobile station 16 checks whether the REG Period IE and REG Parameters IE are present (block 255). If so, the mobile station 16 checks whether the REGID_PER parameter is greater than zero (block 260). If either of these conditions is not met, the mobile station 16 then checks to determine if REGID_PER_TMR is currently running (block 265). If running, REGID_PER_TMR is stopped (block 270) since the parameters necessary to support REGID_PER_TMR are not present. The procedure then ends (block 275) without updating REGID_PER_TMR.

Conversely, if both the REG Period and REGID Parameters IEs are present (block 255) and REGID_PER is greater than zero (block 260), the mobile station 16 then determines the appropriate method of updating REGID_PER_TMR. If NXTREG is equal to the REGID (block 280), the timer REGID_PER_TMR is set equal to MAXREGID (block 285). If NXTREG is greater than the REGID (block 290), the timer REGID_PER_TMR is set equal to the difference in increments between REGID and NXTREG (block 295). If NXTREG is less than the REGID (block 300), the timer REGID_PER TMR is set equal to MAXREGID less the REGID plus NXTREG (block 305). Thus, whichever branch of this procedure is appropriate for the particular situation, the procedure ends (block 275) once REGID_PER_TMR has been set.

Now referring to FIG. 5, the procedure for retrieving REGID is shown. When the procedure is invoked (block 350), the mobile station 16 examines the value of REGID_PER (block 355). If the value of REGID_PER is zero, REGID is set as the parameter REGID received in the Registration Parameters FBCCH message (block 360). Otherwise, the amount of increments remaining is first calculated from the time left in REGID_PER_TMR (block 365). Then, if NXTREG is less than the amount of remaining increments (block 370), the REGID is set as MAXREGID less the number of remaining increments plus NXTREG (block 375). On the other hand, if NXTREG is greater than the amount of remaining increments (block 370), the REGID is set to the difference between NXTREG and the number of remaining increments (block 380). To make certain that REGID does not exceed MAXREGID, the value of REGID is set equal to the remainder of REGID/MAXREGID (block 385) If REGID is less than MAXREGID, no change in REGID will occur. However, if REGID is greater than or equal to MAXREGID, REGID will be set equal to the remainder of REGID divided by MAXREGID. Once the REGID has been determined, the procedure ends (block 390) and control passes back to the invoking procedure.

In review, since the present invention relies on REGID_PER_TMR and its three subprocedures as shown in FIGS. 3A and 3B, 4, and 5, it is essential that REGID_PER_TMR be correct at all times. There are several events that affect REGID_PER_TMR, and the relationship of these events with the enumerated procedures are as follows:
1. When the mobile station 16 locks onto a DCCH, the procedure for updating REGID_PER_TMR as shown in FIG. 4 is executed.
2. When the mobile station 16 reads the Registration Parameters, the procedure for updating REGID_PER_TMR as shown in FIG. 4 is executed.
3. When NXTREG is modified, the procedure for updating REGID_PER_TMR as shown in FIG. 4 is executed.
4. When the mobile station leaves the DCCH processing, REGID_PER_TMR is stopped.

Further, when REGID_PER_TMR expires, the mobile station 16 locks onto a DCCH, or the Registration Parameters are reread from the FBCCH message, Periodic Registration Determination is executed in accordance with IS 136.1, Section 6.3.9 after calculating the REGID using the procedure shown in FIG. 5. Periodic Registration Determination then adjusts NXTREG if necessary. In accordance with the events affecting REGID_PER_TMR as enumerated above, the procedure for updating REGID_PER_TMR as shown in FIG. 4 must then be executed if NXTREG is adjusted by the Periodic Registration Determination. Finally, as part of the Periodic Registration Determination, if the REGID equals or exceeds NXTREG, the mobile station will transmit a periodic registration.

The present invention described heretofore may be more readily understood through an example of its operation. In this example, the mobile station powers down with NXTREG=1,000. When the mobile station 16 is powered up, it scans through the control channels and locks onto a DCCH. At this point, the Registration Parameters FBCCH message having the following configuration is read by the mobile station:

REG Period Information Element is present (REGPER=1)

REGID Parameters Information Element is present (REGID=950, REGID_PER=2)

Since the mobile station has both locked onto a DCCH and read the Registration Parameters, the procedure for updating REGID_PER_TMR as shown in FIG. 4 must be executed.

The procedure for updating REGID_PER_TMR as shown in FIG. 4 starts by determining whether the Reg Period IE and the REGID Parameters IE are present. If these IEs and if REGID_PER is greater than zero (here REGID_PER=2), a branch of the procedure for updating REGID_PER_TMR as shown in FIG. 4 is chosen based on a comparison of NXTREG and REGID. Since NXTREG is greater than REGID, REGID_PER_TMR is calculated according to block 295 in FIG. 4. This calculation is as follows:

REGID_PER_TMR=(NXTREG−REGID)*REGID_PER*640 milliseconds/superframe

REGID_PER_TMR=(1,000 increments−950 increments)*2 superframes/increment*640 milliseconds/superframe REGID_PER_TMR=64,000 milliseconds Therefore, the REGID_PER_TMR timer length is 64 seconds. Thus, the mobile station enters camping for 64 seconds, assuming no intervening events, before REGID_PER_TMR expires.

When REGID_PER_TMR expires, the mobile station 16 sets REGID equal to NXTREG. Thus REGID is set equal to 1,000 increments. After setting REGID, the mobile station 16 performs Periodic Registration Determination. Since REGID is equal to NXTREG, the mobile station 16 formulates a Registration message with a Periodic indication that is transmitted to the base station 12, updating the registration of the mobile station. Once a registration accept is received by the mobile station 16 from the base station 12, the mobile station 16 must perform a Registration Update per IS 136.1, Section 6.3.8. Since both the REG Period and REGID Parameters IEs are present and REGID_PER is greater than zero, NXTREG is modified to REGID+((REGPER+1)*94/REGID_PER)=1,000 increments+((1+1)*94 superframes/2 superframes/increment)=1,094 increments. Thus the new value of NXTREG is 1,094 increments.

Now, since NXTREG has been updated, the procedure for updating REGID_PER_TMR as shown in FIG. 4 is executed to update REGID_PER_TMR. To review, the value of the REGID is 1,000 increments and the value of NXTREG is 1,094 increments; thus, the second branch of the procedure is applicable. It follows that REGID_PER_TMR=(NXTREG−REGID)*REGID_PER*640 milliseconds/superframe=(1,094 increments−1,000 increments)*2 superframes/increment*640milliseconds/superframe=120,320 milliseconds. At this point, the mobile station reenters camping and REGID_PER_TMR begins to count down until the next event occurs.

Based on the forgoing, it follows that by eliminating the REGID system clock, the mobile station no longer needs to perform computations after every superframe to determine if the REGID system clock must be incremented. In addition, the mobile station does not need to determine if REGID is greater than NXTREG each time the REGID system clock is incremented. Thus, one object of the present invention is accomplished whereby the power consumption of the mobile station is lowered since Periodic Registration Determination is only performed after the expiration of REGID_PER_TMR instead of after every superframe.

The present invention may, of course, be carried out in other specific ways than those herein set forth without parting from the spirit and essential character of the invention. The present embodiments are, therefore, to be considered in all respects asillustrative and not restrictive, and all changes coming within the meaning and equivalency range of the appended claims are intended to be embraced therein.

What is claimed is:

1. A method for registering a mobile station in a digital radio commumication system, comprising the steps of:
    a) receiving a registration ID at said mobile station from a base station;
    b) setting a registration timer in said mobile station as a function of a perodic registration threshold and registration ID variable, said registration ID variable received from said base station; and
    c) executing a registration procedure after expiration of said registration timer.

2. The method of claim 1 further including the step of updating the registration ID after said registration timer has expired.

3. The method of claim 1 further including the step of updating said registration timer when the mobile station locks onto a digital control channel (DCCH).

4. The method of claim 1 further including the step of stopping said registration timer when the-mobile station leaves the digital control channel (DCCH).

5. A method for determining whether to transmit a periodic registration signal from a mobile station to a base station when said mobile station is locked onto a digital control channel in a digital communication system, said method comprising the steps of:
    a) storing a periodic registration threshold in the mobile station;
    b) receiving a registration ID variable transmitted to the mobile station by the base station;
    c) setting a registration timer in said mobile station as a function of said registration ID variable and said periodic registration threshold wherein said periodic registration timer monitors time relative to said periodic registration threshold;
    d) incrementing said registration timer while the mobile station is in the camping state; and
    e) executing a registration procedure after expiration of said registration timer.

6. The method of claim 5 further including the step of updating said registration timer when the mobile station locks onto a digital control channel (DCCH).

7. The method of claim 5 further including the step of updating said registration timer when said periodic registration threshold is modified.

8. The method of claim 5 further including the step of updating said registration ID after said registration timer has expired.

9. The method of claim 5 further including the step of stopping said registration timer when the mobile station leaves the digital control channel (DCCH).

10. The method of claim 5 further including the step of calculating a current registration ID prior to executing said registration procedure.

11. The method of claim 10 wherein the mobile station transmits a periodic registration to the base station when said current registration ID is greater than or equal to said periodic registration threshold.

12. The method of claim 11 wherein the mobile station updates said periodic registration threshold after the base station notifies the mobile station that said periodic registration has been accepted by the base station.

13. A mobile communications device comprising:
    a) a receiver for receiving communications from a base containing a registration ID variable;
    b) a transmitter for periodically transmitting registration messages to a base station;
    c) a control sizing unit operatively connected to said transmitter and said receiver for setting a registration timer as a function of said registration ID variable and a periodic registration threshold, said registration ID variable received from said base station and for causing said transmitter to send a registration message to said base station when said registration timer expires.

* * * * *